US006614741B1

(12) United States Patent
Hesselink et al.

(10) Patent No.: US 6,614,741 B1
(45) Date of Patent: Sep. 2, 2003

(54) OPTICAL DATA STORAGE BY SELECTIVE LOCALIZED ALTERATION OF A FORMAT HOLOGRAM IN A HOLOGRAPHIC STORAGE DISK

(75) Inventors: Lambertus Hesselink, Woodside; Robert R. McLeod, Morgan Hill; Sergei L. Sochava, Sunnyvale, all of CA (US)

(73) Assignee: Research Investment Network, Inc., Irvine, CA (US)

( * ) Notice: Subject to any disclaimer, the term of this patent is extended or adjusted under 35 U.S.C. 154(b) by 0 days.

(21) Appl. No.: 09/192,165

(22) Filed: Nov. 13, 1998

Related U.S. Application Data (63) Continuation-in-part of application No. 09/016,382, filed on Jan. 30, 1998.

(51) Int. Cl.[7] .................................................. G11B 7/00
(52) U.S. Cl. ................................ 369/103; 369/275.1
(58) Field of Search ............................... 369/103, 112, 369/109, 1, 44.11, 44.12, 44.14, 44.23, 44.27, 44.28, 44.34, 44.37, 275.1

(56) References Cited

U.S. PATENT DOCUMENTS

| 3,618,049 A | 11/1971 | Amodei et al. ............. 340/173 |
| 3,704,929 A | 12/1972 | Sakaguchi, et al. .......... 350/3.5 |
| 3,720,921 A | 3/1973 | Schools et al. ............. 340/173 |
| 3,947,640 A | 3/1976 | Ruell et al. ............ 179/100.3 B |
| 4,024,513 A | 5/1977 | Huignard et al. ............ 340/173 |
| 4,045,115 A | 8/1977 | Lee .............................. 350/3.5 |
| 4,138,189 A | 2/1979 | Huignard et al. .......... 350/3.64 |
| 4,183,094 A | 1/1980 | Keezer et al. ............... 365/127 |
| 4,318,581 A | 3/1982 | Guest et al. ................ 350/3.74 |
| 4,458,345 A | 7/1984 | Bjorklund et al. .......... 369/103 |
| 4,859,548 A | 8/1989 | Heise et al. .................... 430/1 |
| 4,920,220 A | 4/1990 | Phaff ............................ 544/90 |
| 4,999,234 A | 3/1991 | Cowan ........................ 428/156 |
| 5,202,875 A | 4/1993 | Rosen et al. .................. 369/94 |
| 5,243,589 A | 9/1993 | Stuke et al. ................. 369/100 |

(List continued on next page.)

FOREIGN PATENT DOCUMENTS

| DE | 4208328 | 3/1992 |
| DE | 42 08 328 A1 | 9/1993 |
| DE | 195 34 501 | 9/1995 |
| DE | 195 34 501 A1 | 5/1996 |
| WO | WO 99/39248 | 8/1999 |

OTHER PUBLICATIONS

Eichler, et al. "Multiplexed Holograms for the Microholographic Storage Disc", May 10–13, 1998, Technical Digest, vol. 8, pp. 77–79.

(List continued on next page.)

*Primary Examiner*—Muhammad Edun
(74) *Attorney, Agent, or Firm*—Keiji Masaki; Steve Wong; Richard Stokey (57) ABSTRACT

Digital data bits are stored at storage locations at plural depths within a holographic medium of a holographic storage disk in the form of selective, localized alterations in a format hologram. Micro-localized regions of a reflection format hologram extending throughout the medium are deleted by focusing a high-power laser beam at desired storage locations. The deletion regions have a lower reflectivity than the surrounding parts of the format hologram. Tunable-focus storage and retrieval heads, as well as dynamic aberration compensators, are used for multi-depth access. Storage and retrieval may each be achieved with a single head.

17 Claims, 5 Drawing Sheets

U.S. PATENT DOCUMENTS

| | | | |
|---|---|---|---|
| 5,283,777 A | 2/1994 | Tanno et al. | 369/108 |
| 5,289,407 A | 2/1994 | Strickler et al. | 365/106 |
| 5,422,873 A | 6/1995 | Kewitsch et al. | 369/103 |
| 5,440,669 A | 8/1995 | Rakuljik et al. | 359/7 |
| 5,450,218 A | 9/1995 | Heanue et al. | 359/21 |
| 5,479,394 A | 12/1995 | Yashima et al. | 369/275.1 |
| 5,636,190 A | 6/1997 | Choi | 369/44.23 |
| 5,659,536 A | 8/1997 | Maillot et al. | 369/275.1 |
| 5,737,294 A | 4/1998 | Yamakawa et al. | 369/44.37 |
| 5,759,721 A | 6/1998 | Dhal et al. | 430/1 |
| 5,761,111 A | 6/1998 | Glezer | 365/106 |
| 5,786,117 A | 7/1998 | Hoshi et al. | 430/21 |
| 5,966,361 A | 10/1999 | Stoll | 369/103 |
| 5,982,513 A * | 11/1999 | Zhou et al. | 369/44.11 |
| 6,111,828 A * | 8/2000 | McLeod et al. | 369/44.23 |

OTHER PUBLICATIONS

Diez, et al. "High Density Disc Storage by Multiplexed Microholograms", SPIE–The International Society for Optical Engineering, vol. 3109, Apr. 7–9, 1997, pp. 258–259.

Eichler, et al. "High Density Disc Storage by Multiplexed Microholograms", Technical Unversity of Berlin. SPIE, vol. 3109, pp. 239–244.

Eichler, et al. "Holographic Recording of Microscopic Bragg–Reflectors for Optical Data Storage", Technical University Berlin, SPIE vol. 3401, pp. 118–127.

Fleisher, et al. "An Optically Accessed Memory Using the Lippmann Process for Information Storage", Optical and Electro–Optical Information Processing, Chap. 1, 1965 MIT Press, pp. 11–40.

Homan, et al. "High–Capacity Optical Storage Using Multiple Wavelenghts, Multiple Layers and Volume Holograms", Electronics Letters, Apr. 13, 1995, vol. 31, No. 8, pp. 621–623.

Kawata, et al. "Randomly Accessible, Multilayered Optical Memory with as Bi 12 Sio 20 Crystal", Applied Optics, vol. 35, No. 26, Sep. 10, 1996, pp. 5308–5311.

Kawata, et al. "Three–Dimensional Optical Mamory with a Photorefractive Crystal", Jul. 10, 1995, vol. 34, No. 20, Applied Optics, pp. 4105–4110.

Parthenopoulos, et al. "Three–Dimensional Optical Storage Mamory", Department of Chemistry, University of California, Irvine, Aug. 25, 1989, pp. 843–845.

Glezer, et al. "Three–Dimensional Optical Storage Inside Transparent Materials", Dec. 15, 1996, vol. 21, No. 24, Optics Letters, pp. 2023–2025.

Glezer et al., Three–dimensional optical storage inside transparent, Op. Soc. of Am., vol. 21, No. 24, 1996.

Homan, S., High capacity optical storage using multiple wavelengths, multiple layers and volume holograms, Elec. Letters, 31(8), pp. 621–623, 1995.

Eichler, H., High density disc storage by multiplexed microholograms, SPIE, vol. 3109, pp. 239–244, 1997.

Fleisher, H. et al., An optically assessed memory using the uppmann process for information storage, Op. Elec. Info. Proc., Chap. 1, pp. 11–40, MIT Press 1965.

Parthenopoulos, D et al., Three–dimensional optical storage memory, Science, vol. 245, pp. 843–845, 1989.

Kawata, Y. et al., Three–dimensional optical memory with a photorefractive crystal, Appl. Opt. (34) 20, pp. 4105–4110, 1995.

Kawata, Y. et al., Randomly accessible multilayers optical memory with a Bil2Si020 crystal Appl. Opt., (35) 26, pp. 5308–5311, 1996.

Eichler, H. et al., Multiplexed holograms for the microholographic storage disc, Conference Proceedings for Optical Data Storage '98, pp. 77–79, May 10, 1998.

Eichler, H. et al., Holographic recording of microscopic Bragg–reflectors for optical data storage, Conference Proceedings for Optical Data Storage '98, pp. 159–161, May 10, 1998.

Diez, S., High density disc storage by multiplexed microholograms, Optical Institute of Tech. Univ. of Berlin, Strasse des 17, Juni 135, 10623 Berlin Germany, CLEO 1997, pp. 258–259.

Wavelength Multiplexing for the Microholographic, H.J. Eichler, pp. 177–186, SPIE vol. 3401.

Structure of Wave Fields Formed by 3–D Vector Holograms, V.M. Serdyuk, Dec. 2, 1981, pp. 415–418.

* cited by examiner

OPTICAL DATA STORAGE BY SELECTIVE LOCALIZED ALTERATION OF A FORMAT HOLOGRAM IN A HOLOGRAPHIC STORAGE DISK

RELATED APPLICATION DATA

This application is a continuation-in-part of pending application Ser. No. 09/016,382 filed on Jan. 30, 1998.

FIELD OF THE INVENTION

The present invention relates to the field of holographic data storage, and in particular to a system and method for storing data as micro-localized alterations in a holographic storage disk provided with a format hologram.

BACKGROUND OF THE INVENTION

In conventional holographic storage, data is stored as holograms resulting from the interference of a signal and reference beam. During storage, both the reference and signal beams are incident on the storage medium. During retrieval, only the reference beam is incident on the medium. The reference beam interacts with a stored hologram, generating a reconstructed signal beam proportional to the original signal beam used to store the hologram.

For information on conventional volume holographic storage see for example U.S. Pat. Nos. 4,920,220, 5,450,218, and 5,440,669. In conventional volume holographic storage, each bit is stored as a hologram extending over the entire volume of the storage medium. Multiple bits are encoded and decoded together in pages, or two-dimensional arrays of bits. Multiple pages can be stored within the volume by angular, wavelength, phase-code, or related multiplexing techniques. Each page can be independently retrieved using its corresponding reference beam. The parallel nature of the storage approach allows high transfer rates and short access times, since as many as $10^6$ bits within one page can be stored and retrieved simultaneously.

Conventional page-based volume holographic storage generally requires complex, specialized components such as amplitude and/or phase spatial light modulators. Moreover, ensuring that the reference and signal beams are mutually coherent over the entire volume of the storage medium generally requires a light source with a relatively high coherence length, as well as a relatively stable mechanical system. Mechanical stability and coherence-length requirements have hindered the development of inexpensive, stable, and rugged holographic storage devices capable of convenient operation in a typical user environment.

In U.S. Pat. No. 4,458,345, Bjorklund et al. describe a bit-wise volume holographic storage method using signal and reference beams incident on a rotating disk in a transmission geometry. The signal and reference beams are incident from the same side of the disk. The angle between the reference and signal beams can be altered to store holograms at various depths within the medium. A separate photodetector is used to retrieve data stored at each depth. The interaction of light with the medium is localized through two-photon recording.

In U.S. Pat. No. 5,659,536, Maillot et al. describe a system in which multiple holograms are stored at each location in a disk through wavelength multiplexing. Each hologram spans the depth of the medium. In U.S. Pat. No. 5,289,407, Strickler et al. describe a multi-layered, non-holographic, index-perturbation optical storage system. Bits are stored as localized perturbations in the index of refraction of a photopolymer, caused by the high intensity at the focus of a single laser beam.

SUMMARY OF THE INVENTION

Briefly, and in general terms, the present invention provides a multi-depth, bit-wise optical data storage and/or retrieval system using a holographic disk and method having improved storage density, and in which the optical components used for storage and retrieval can be relatively simple, inexpensive, and robust.

With the present invention, a format hologram is first stored in a holographic medium of a holographic storage device, and data are then stored as selective, microlocalized alterations of the format hologram. The alterations are stored at a plurality of depths within the medium, thereby allowing the storage of multiple data layers. The device uses a holographic medium which is flexible or hard and comes in the form of a disk or card.

Storing the format hologram, which requires maintaining mutual coherence between two light beams, can be performed in controlled conditions in a factory environment. Data storage and retrieval can then be performed in a user environment using a relatively simple and robust device. Storage or retrieval can be performed using a single light beam incident on the medium, and using a single optical head.

In a presently preferred embodiment, the format hologram is a reflection hologram stored throughout the volume of the medium, and having substantially planar fringes oriented parallel to a surface, e.g., the top surface, of a disk. The reflection hologram is capable of reflecting light traveling along the depth of the medium. Partial or complete deletion of the reflection hologram generates storage locations of lower reflectivity than the surrounding intact regions of the hologram. In one embodiment the disk can be made of flexible materials, i.e., the disk is a flexible or floppy disk Other features and advantages of the invention will become apparent from the following detailed description, taken in conjunction with the accompanying drawings, which illustrates by way of example the invention.

DESCRIPTION OF THE FIGURES

FIG. 2-A shows a schematic perspective view of a preferred data storage and/or retrieval system of the present invention, illustrating its geometry and mechanical components.

FIG. 2-B shows a schematic view of the optical components of a preferred storage system of the present invention.

FIG. 2-C shows a schematic view of the optical components of a preferred retrieval system of the present invention.

FIG. 3-A shows an enlarged schematic side view of a format hologram and a localized alteration in the format hologram, according to one embodiment the present invention.

FIG. 3-B is an enlarged schematic side view of a storage medium illustrating an arrangement of storage locations at a plurality of depths, according to the present invention.

DETAILED DESCRIPTION

Figure 1:
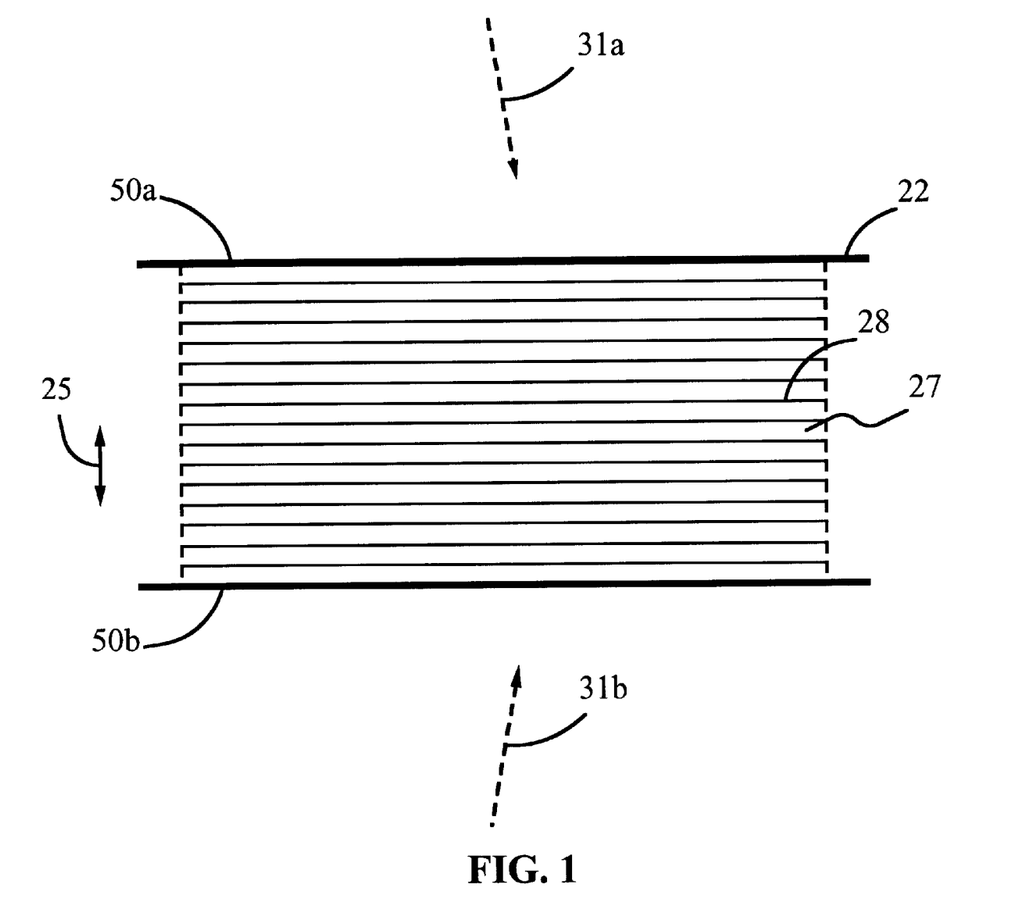
FIG. 1 shows a schematic side view of a storage medium and two plane-wave beams used to store a format hologram within the medium, according to a preferred embodiment of the present invention.

FIG. 1 shows a schematic side view of a holographic storage medium 22 containing a substantially planar format hologram (holographic grating) 27 stored within medium 22, according to a preferred embodiment of the present invention. The fringes of hologram 27 are marked 28. For clarity, the spacing between fringes 28 is exaggerated in FIG. 1 relative to the thickness of medium 22; medium 22 preferably comprises a larger number of fringes than shown. Medium 22 is formed of a structurally homogeneous planar layer of a photopolymer having a thickness preferably on the order of hundreds of $\mu m$, for example about 100–200 $\mu m$ or less. The photopolymer is situated between two layers of flexible material that transmits light at the operating wavelength. For information on photopolymers see for example Lessard and Manivannan (ed.), *Selected Papers on Photopolymers,* SPIE Milestone Series, v. MS-114, SPIE Optical Engineering Press, Bellingham, Wash., 1995. Formatting optics (not shown) in optical communication with medium 22 generate two plane-wave light beams 31a–b incident on opposite (top and bottom) planar input surfaces 50a–b of medium 22, respectively. Surfaces 50a–b are transverse to the depth 25 of medium 22. Beams 31a–b have identical wavelengths and are mutually coherent. Beams 31a–b each contain single plane-wave components. The interference of beams 31a–b within medium 22 generates hologram 27. Hologram 27 is preferably a phase hologram, characterized by a periodic variation in the real component of the index of refraction.

Hologram 27 is preferably an elementary hologram, i.e. a hologram written by two plane-wave beams. The variation of hologram 27 along depth 25 can be characterized by a single spatial frequency. The fringes 28 of hologram 27 are mutually parallel, and are regularly spaced apart along the depth 25 of medium 22. Hologram 27 is preferably substantially uniform across medium 22 in the plane orthogonal to depth 25, and is recorded in one step for the entire volume of medium 22.

Figure 2:
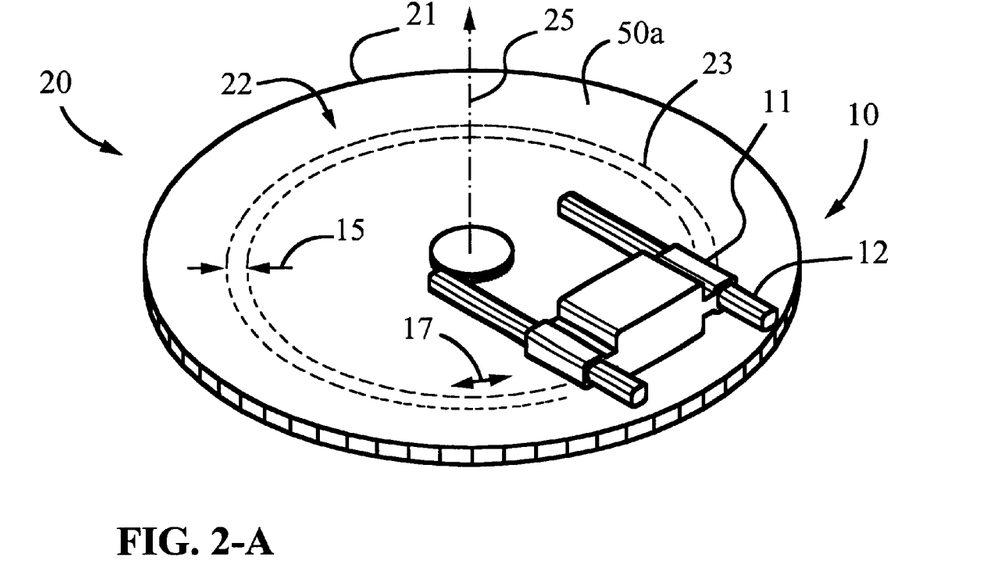

FIG. 2-A shows a perspective schematic view of a presently preferred optical data storage and/or retrieval system 20. A holographic storage disk 21 comprises medium 22 as well as packaging elements for mechanically protecting medium 22 and for mounting disk 21. Hologram 27 is stored within medium 22, and is insensitive to ambient heat and light levels within medium 22. Disk 21 is detachably mounted on a rotary holder 24. Holder 24 continuously rotates disk 21 at high velocity about an axis of rotation coinciding with depth 25.

Multiple storage subvolumes of medium 22 are stacked along depth 25. Each subvolume contains plural concentric data tracks 23. Adjacent data tracks at one depth are separated along a generally radial direction 15, while storage locations along a data track are separated along a circumferential direction 17.

A head assembly 10 is used to access desired storage locations within medium 22. Head assembly 10 and holder 24 are connected to a fixed housing (not shown). Head assembly 10 comprises a movable carriage assembly 11 and fixed, generally radial, mutually parallel rails 12. Carriage assembly 11 is movably mounted on rails 12. Carriage assembly 11 is capable of linear motion along rails 12 along radial direction 15, relative to medium 22. Carriage assembly 11 comprises a voice coil actuator for controlling its coarse tracking positioning along rails 12, with respect to disk 21. Carriage assembly 11 faces top input surface 50a of disk 21.

FIG. 2-B shows a schematic view of the optics 26 of a preferred storage system of the present invention. Optics 26 are used to generate a storage light beam 30a, and to direct storage beam 30a onto desired storage locations within medium 22 of disk 21. Optics 26 are mechanically coupled to holder 24 such that storage beam 30a is incident on medium 22 through input surface 50a when disk 21 is mounted on holder 24. Optics 26 comprise a light source 34 for generating beam 30a, and a tunable-focus storage head 46 in optical communication with light source 34. Storage head 46 directs and focuses beam 30a onto desired storage locations 52 within medium 22.

Light source 34 is preferably a laser with a high enough output power to allow altering format hologram 27 in a detectable and localized manner. Storage head 46 comprises a high numerical aperture (N.A.) objective lens 48 facing disk 21, and a dynamic aberration compensator 39 in the light path between light source 34 and objective lens 48. Objective lens 48 generally has a N.A. higher than 0.25, in particular higher than about 0.4 and preferably about 0.5. High numerical apertures are desirable since they allow relatively short depths of field, and consequently relatively close spacings between adjacent storage locations 52 along the depth of the medium. High numerical apertures also allow relatively small spot sizes at the focus of beam 30a, and consequently small spacings along a track 23 and between tracks 23. Increasing numerical apertures above about 0.5 or 0.6 may lead to substantially increased complexity in the optics required for storage and retrieval, and to relatively stringent tolerances on mechanical components.

Lens 48 is mounted on a dual-axis actuator 47, which controls the focusing and fine-tracking position of lens 48 relative to medium 22. The focusing actuator controls the vertical (in-depth) motion of lens 48 relative to medium 22, both coarsely for accessing different depth layers and finely for maintaining lens 48 focused on a desired depth layer. Fine-tracking positioning is performed along the radial direction of medium 22, i.e. across tracks 23.

Dynamic aberration compensator 39 dynamically compensates for the variable spherical aberration introduced in beams 30a–b by medium 22. The spherical aberration in each beam depends on the depth accessed by the beam. Aberration compensators are known in conventional optical recording. Various dynamic aberration compensators have been described for conventional pit-based storage, for example in U.S. Pat. No. 5,202,875 (Rosen et al). While aberration compensator 39 is shown for clarity as separate from objective lens 48 and actuator 47, aberration compensator 39 may be integrated with lens 48. Dynamic aberration compensator may also be situated between the lens and the disk. For details about spherical aberration compensation refer to U.S. Pat. No. 5,202,875 to Rosen et al. and to U.S. patent application Ser. No. 09/109,111 entitled "Spherical Aberration Correction Using Flying Head Lens and Method" by Mark E. McDonald and Yu Chuan Lee, filed Jul. 2, 1998.

Figure 3:
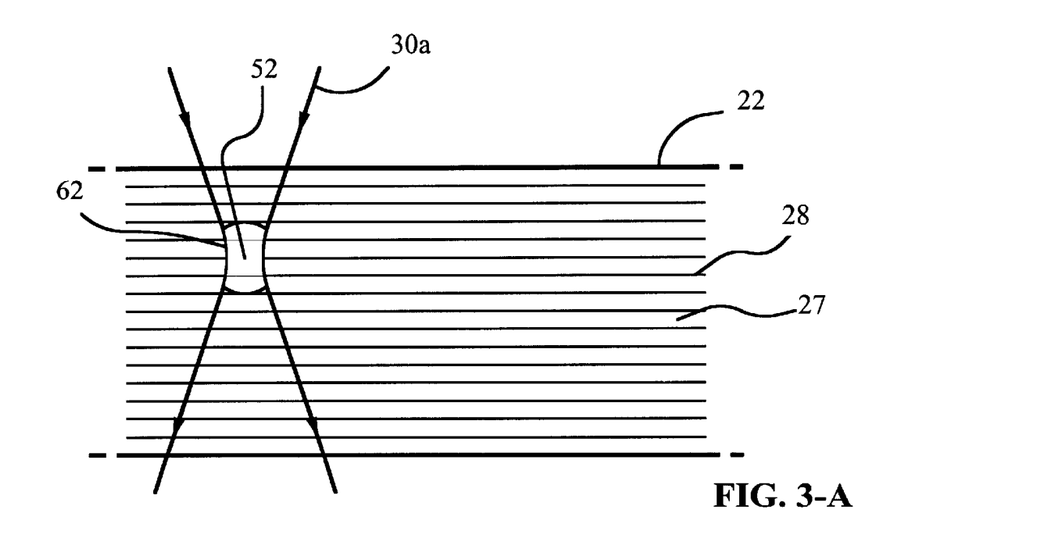

During storage, lens 48 focuses beam 30a at storage locations 52 at desired depths within medium 22. Beam 30a causes selective micro-localized alterations in hologram 27 at the chosen storage locations 52. A description of preferred characteristics of such alterations can be found below with reference to FIGS. 3-A and 3-B.

FIG. 2-C schematically illustrates the optics 126 of a preferred retrieval system of the present invention. During retrieval, optics 126 are used to generate an input light beam 130a, to direct input beam 130a onto desired storage locations within medium 22, and to direct an output beam 130b reflected by medium 22 towards a detector 58. The intensity of input beam 130a is low enough so that beam 130a does not cause substantial deletion of format hologram 27.

Optics 126 are mechanically coupled to holder 24 such that input beam 130a is incident on medium 22 through input surface 50a when disk 21 is mounted on holder 24. Optics 126 comprise a light source 134 for generating beam 130a, and a tunable-focus retrieval head 146 in optical communication with light source 134. Retrieval head 146 directs and focuses beam 130a onto desired storage locations 52 within medium 22, and captures and directs output beam 130b to detector 58.

Light source 134 comprises a laser. Retrieval head 146 comprises a high-N.A. objective lens 48 facing surface 50a of disk 21, a dynamic aberration compensator 39 in the light path between light source 34 and objective lens 48, an optical detector 58 in optical communication with medium 22, and beam separation components 38 for directing beam 130a toward medium 22 while directing output beam 130b toward detector 58. Beam separation components 38 separate beams 130a and 130b. Beam separation components 38 are conventional. Beam separation components 38 comprise a polarizing beam splitter (PBS) 54 and a quarter-wave plate 56 situated in the optical path of beams 130a–b, between light source 134 and medium 22. Polarizing beam splitters and quarter wave plates are used instead of simple beamsplitters for reducing losses at the separation elements.

Detector 58 is a confocal, depth-selective detector comprising spatial filtering optics for allowing detector 58 to selectively access only storage locations at desired depths within medium 22. Spatial filtering optics are well known. The spatial filtering optics preferably include an appropriately placed pinhole for selectively allowing only rays reflected from an accessed storage location to be directed to detector 58. The pinhole blocks stray light from non-accessed regions of medium 22, which would otherwise be incident on detector 58.

During retrieval, input beam 130a is reflected by medium 22 to a generate output beam 130b. Beams 130a–b are substantially counterpropagating, and both pass through surface 50a. Output beam 130b is captured by lens 48 and directed by optics 126 to detector 58. The intensity of output beam 130b is indicative of the interaction between input beam 130a and medium 22 at the accessed storage location 52.

FIG. 3-A illustrates a localized alteration 62 in hologram 27, stored at the focus of storage beam 30a at storage location 52. Hologram 27 is magnified for clarity of presentation; in the preferred embodiment, alteration 62 extends over tens of fringes 28. Fringes 28 are substantially planar, and locally define the direction of back-reflection of format hologram 27 at each location 52. The direction of reflection is preferably the same throughout medium 22.

Alteration 62 may be represented as a micro-localized variation in the amplitude and/or phase of hologram 27. Alteration 62 is preferably a deletion in hologram 27, such that the reflectivity of medium 22 at storage location 52 is less than the reflectivity of the surrounding intact parts of hologram 27. The depth of alteration 62 can be defined as the depth over which its associated index variation is within a given factor (e.g. a factor of 2) of the variation at the focus of storage beam 30a.

Alteration 62 is preferably stored at the diffraction limit of high-N.A. optics. Alteration 62 preferably extends over a depth of less than a few tens of microns (e.g. <50 $\mu$m), in particular about 20 $\mu$m or less. The depth of alteration 62 is preferably comparable to the Rayleigh range of storage beam 30a. Alteration 62 preferably has a spot (in plane) size of less than a few microns (e.g. <5 $\mu$m), in particular approximately one to two $\mu$m. An alteration length of 1 $\mu$m corresponds to a readout time of tens of ns for a medium speed of tens of m/s. The spot size characterizes the width of a track. The spot size may limit the minimal intertrack spacing, as well as the data density along a track. Adjacent tracks are preferably spaced by a distance at least on the order of the alteration spot size. Adjacent alterations along a track are also separated by a distance at least on the order of the alteration spot size.

During storage, beam 30a is focused at high intensity at storage location 52. The localized high intensity causes the localized deletion of hologram 27 at storage location 52. During retrieval, beam 130a is focused within medium 22 at the depth of location 52. If beam 130a is focused on an intact region of hologram 27, the resulting intensity of reflected output beam 130b is relatively high. If beam 130a is focused on a deleted part of hologram 27, the intensity of the resulting reflected output beam 130b is relatively low.

During readout, input beam 130a is Bragg-matched at its focus to hologram 27. That is, the wavelength of input beam 130a at its focus is equal to the wavelength of hologram 27. As is apparent to the skilled artisan, any substantial Guoy shift within beam 130a, shrinkage within medium 22, or background index changes during storage within medium 22 are taken into account for Bragg-matching beam 130a to hologram 27. For information on the Guoy shift see for example Siegman, *Lasers,* University Science Books, Mill Valley, Calif., 1986, p. 682–685. Shrinkage and background index changes in photopolymers are well characterized in the art.

FIG. 3-B shows a side sectional view through medium 22, illustrating a preferred relative arrangement of alterations 62 in depth. Multiple plate-shaped subvolumes 66 of alterations 62 are stacked along the depth of medium 22. Adjacent subvolumes are separated by a center-to-center distance on the order of the alteration depth or depth of focus of input beam 30a. During storage of alterations 62, storage beam 30a is maintained focused within a subvolume at a constant depth, as medium 22 is moved relative to beam 30a along a track 23 within the subvolume. During retrieval, medium 22 is moved at constant velocity with respect to input beam 130a.

Consider two alterations 62', 62" situated in different (e.g. adjacent) subvolumes, at different depths within medium 22. When storage beam 30a is focused at the location of alteration 62', the out-of-focus parts of storage beam 30a also illuminate and may partially delete the region of hologram 27 surrounding the storage location of alteration 62". The out-of-focus light used for accessing the location of alteration 62' can reduce the contrast achievable for reading out of alteration 62". The degradation of optical properties at one depth due to data storage at other depths within medium 22 can be characterized by the "scheduling loss" of the system. Scheduling losses can limit the number of data layers that may be stacked along the depth of medium 22. An optically non-linear storage material can be used to reduce scheduling losses. Scheduling losses can also be reduced by offsetting vertically-adjacent tracks or alterations in the radial direction, such that alterations in adjacent depth layers are not vertically aligned.

Figure 4:
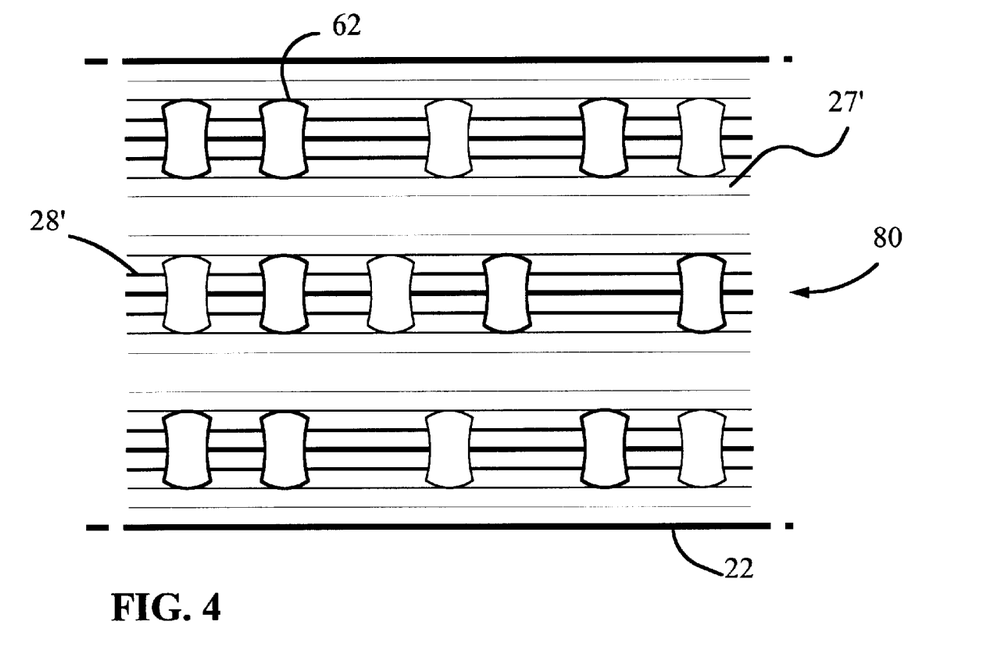
FIG. 4 shows an enlarged schematic side view of a storage medium including a format hologram whose variation along the depth of the medium is characterized by two closely-spaced spatial frequencies, according to another embodiment of the present invention.

FIG. 4 illustrates a side sectional view of medium 22 in an alternative embodiment of the present invention. A format hologram 27' stored within medium 22 comprises a plurality of distinct storage subvolumes 80 stacked along depth 25. Each storage subvolume 80 is characterized by the presence of reflective fringes of format hologram 27, while the space between adjacent subvolumes is characterized by a relative lack of variation in the index of refraction within medium 22. The variation of hologram 27' along depth 25 is characterized by two closely-spaced spatial frequencies. The difference between the two frequencies defines the spacing between adjacent storage subvolumes 80. Format hologram 27' can be stored through the interference of two pairs of beams incident on medium 22, each pair at a distinct frequency. Each pair is similar to the beam pair described with reference to FIG. 1.

In one embodiment, the wavelength of the input beam used during retrieval is different from that of the storage beam, and chosen to minimize the effect of the input beam on the format hologram. The two wavelengths are chosen such that the storage medium is more photosensitive at the storage wavelength than at the retrieval wavelength. Using wavelengths corresponding to different medium photosensitivities can facilitate altering the format hologram at the storage wavelength while ensuring that the retrieval light does not substantially alter (e.g. delete) the format hologram.

Parallel readout can be accomplished by using a light source comprising a plurality of mutually incoherent lasers aligned in close proximity. The lasers generate spatially separated, mutually incoherent input beams. The input beams are imaged onto a radial line such that each input beam is focused on one of a number of adjacent tracks within the medium. A detector comprising multiple independent aligned detecting elements is then used for data retrieval. Each of the reconstructed output beams is incident on one of the detecting elements. Since the input beams are mutually incoherent, they do not interfere even if their corresponding tracks are closely spaced.

In the preferred storage and retrieval system of FIG. 1, disk 21 is a hard disk. It is made of a holographic medium 22 and, if necessary, additional reinforcing materials or mechanisms (not shown) which the format grating or its alteration during storage.

Figure 5:
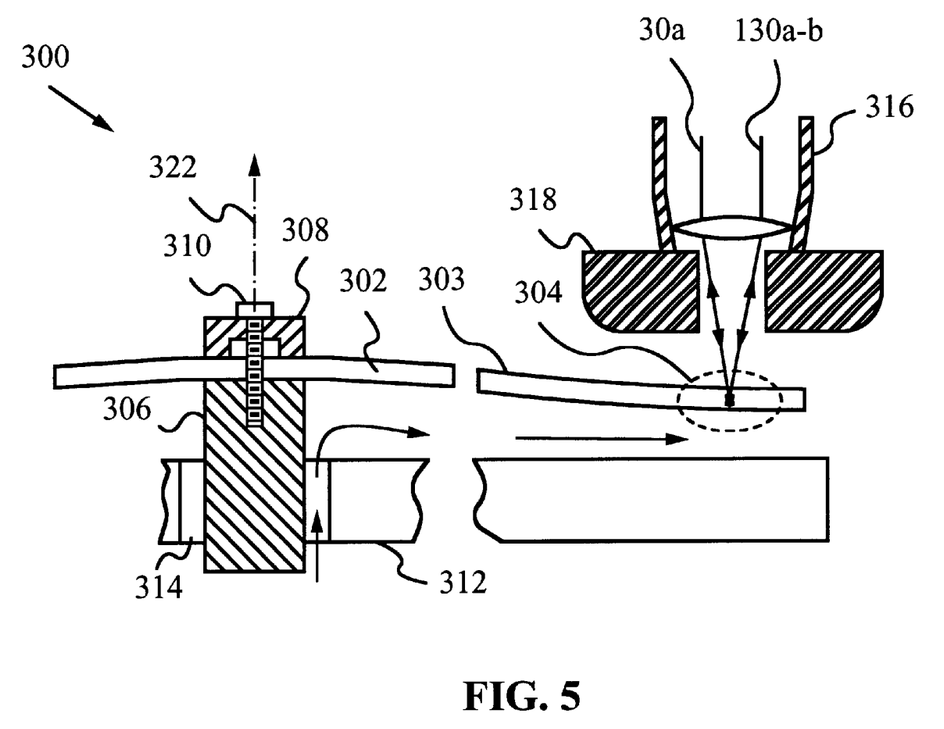
FIG. 5 is a cross-sectional view illustrating the adaptation of a holographic storage and/or retrieval system according to the invention to a flexible disk.

In yet another embodiment of the invention a retrieval system 300 is equipped with a flexible disk 302 as shown in FIG. 5. The fringes of the format hologram are parallel to a top surface 303 of flexible disk 302. During storage and retrieval of information from the format hologram it is important that surface 303 be maintained flat to ensure proper orientation of the format hologram with respect to light beams 30a and 130a–b used for storing and retrieving data. Hence, system 300 employs a passive method for maintaining planarity of a portion 304 of disk 302.

Specifically, disk 302 is mounted on a shaft 306 and held down by a cap 308 attached to the spindle by a screw 310. Shaft 306 passes through a base plate 312 provided with a ring-shaped air duct 314. When disk 302 rotates about an axis 322 defined by shaft 306 a spiraling air current develops moving outwards as indicated by the arrows. As a result portion 304 of disk 302 is maintained flat and a storage/retrieval head 316 mounted on a positioning actuator 318 can store data in the format grating and retrieve data from it.

For more information about relevant parameters for maintaining a portion of a flexible disk planar in the manner employed by the embodiment shown in FIG. 5 see U.S. Pat. Nos. 4,447,899 and 4,672,599 both by Geyer et al. Information on other systems for achieving the same objective can be found in U.S. Pat. No. 3,980,810 by Tinet.

It will be clear to one skilled in the art that the above embodiments may be altered in many ways without departing from the scope and spirit of the invention. The storage medium material need not be a photopolymer. For example, various storage materials known in the art can be suitable for the present invention, including photopolymers, photosensitive glasses, and photorefractive materials. Various mechanisms for the interaction between the storage light beam and the medium are suitable for altering the format hologram. For example, the storage light beam may selectively alter the format hologram by physically altering the medium structure. The alteration may directly depend on the maximal light intensity (power/area) within the medium, or on the fluence (energy/area) of the light beam. The material may be sensitized by illumination at one wavelength for selectively altering the format hologram using localized light of another wavelength.

The format hologram need not be completely uniform in plane, nor completely regular in its depth variation. The format hologram may comprise distinct, independently-recordable and addressable sectors. The format hologram need not be a phase hologram, and may be an absorption hologram. The alterations in the format hologram need not be uniform round spots. As the disk continuously rotates, a continuous alteration can be written, and the intensity of the writing beam can be varied in time to store information as micro-localized variations in the format hologram according to a suitable modulation code.

Multiple discrete amplitude/phase levels for the alterations can be used for digital gray scale storage. Continuous levels can be used for analog storage. Deletions of the format hologram can be complete or partial deletions. Various track arrangements, both in plane and in depth, can be used; such an arrangement includes a 3-D Cartesian array. The storage medium need not be disk-shaped; data may be stored in a Cartesian geometry, with the heads controlled by x-y stages. Various mounting and actuating (e.g. rotary/linear, horizontal and vertical) arrangements for the heads may be suitable. The storage medium may be moved relative to a vertically-fixed head to bring different depths in focus. The storage medium need not be packaged in a disk-like storage device; various other storage devices (e.g. cartridges or cards) may be suitable. Various types of lasers can be used as light sources, including diode, solid state, and other types of lasers. The light source may include a non-linear frequency-converter in addition to a laser.

It will be apparent from the foregoing that, while particular forms of the invention have been illustrated and described, various modifications can be made without departing from the spirit and scope of the invention. Accordingly, it is not intended that the invention be limited, except as determined by the following claims and their legal equivalents.

What is claimed is:

1. An optical data storage device having an optical storage disk comprising:

a) an optical storage medium;

b) a format hologram stored in said optical storage medium; and c) localized alterations in said format hologram at selected data storage locations, said localized alterations representing data.

2. The optical data storage device of claim 1 wherein said optical storage disk is a flexible disk.

3. The optical data storage device of claim 2 further comprising a means for maintaining a predetermined portion of said flexible disk planar.

4. The optical data storage device of claim 1 wherein said optical storage disk is a hard disk.

5. The optical data storage device of claim 1 further comprising a tunable-focus storage head positioned above said optical storage disk for illuminating said optical storage medium and producing said localized alterations in said format hologram.

6. The optical data storage device of claim 5 wherein said tunable-focus storage head is carried on a positioning actuator.

7. An optical storage disk comprising:
   a) an optical storage medium having a top surface and a bottom surface;
   b) a format hologram stored in said optical storage medium; and
   c) localized alterations in said format hologram at selected data storage locations, said localized alterations representing data.

8. The optical storage disk of claim 7 wherein said format hologram comprises a holographic grating having fringes extending substantially parallel to said top surface.

9. The optical storage disk of claim 7 wherein said format hologram defines a plurality of recording subvolumes stacked along a depth of said holographic storage disk, each of said recording subvolumes having a layer of said data stored therein.

10. The optical storage disk of claim 7 wherein said format hologram is selected from the group consisting of reflection holograms, phase holograms and elementary holograms.

11. The optical storage disk of claim 7 wherein said localized alterations comprises localized deletions of said format hologram.

12. An optical data retrieval device having an optical storage disk comprising:
   a) an optical storage medium;
   b) a format hologram stored in said optical storage medium; and
   c) localized alterations in said format hologram at selected data storage locations, said localized alterations representing data.

13. The optical data retrieval device of claim 12 wherein said optical storage disk is a flexible disk.

14. The optical data retrieval device of claim 13 further comprising means for maintaining a predetermined portion of said flexible disk planar.

15. The optical data retrieval device of claim 12 wherein said optical storage disk is a hard disk.

16. The optical data retrieval device of claim 12 further comprising a tunable-focus retrieval head positioned above said optical storage disk for illuminating said optical storage disk with an input beam and capturing an output beam indicative of an interaction of said input beam with said localized alterations in said format hologram.

17. The optical data retrieval device of claim 16 wherein said tunable-focus retrieval head is carried on a positioning actuator.

* * * * *